United States Patent
Yu et al.

(10) Patent No.: US 12,335,540 B2
(45) Date of Patent: Jun. 17, 2025

(54) IMAGE PROCESSING, NETWORK TRAINING AND ENCODING METHODS, APPARATUS, DEVICE, AND STORAGE MEDIUM

(71) Applicants: ZHEJIANG UNIVERSITY, Hangzhou (CN); GUANGDONG OPPO MOBILE TELECOMMUNICATIONS CORP., LTD., Dongguan (CN)

(72) Inventors: Lu Yu, Dongguan (CN); Bingjie Zhu, Dongguan (CN); Zhenyu Dai, Dongguan (CN)

(73) Assignees: ZHEJIANG UNIVERSITY, Hangzhou (CN); GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/380,987

(22) Filed: Oct. 17, 2023

(65) Prior Publication Data
US 2024/0064338 A1 Feb. 22, 2024

Related U.S. Application Data

(63) Continuation of application No. PCT/CN2021/098413, filed on Jun. 4, 2021.

(30) Foreign Application Priority Data

Apr. 17, 2021 (CN) .......................... 202110415028.1

(51) Int. Cl.
H04N 19/91 (2014.01)
H04N 19/124 (2014.01)
H04N 19/184 (2014.01)

(52) U.S. Cl.
CPC ........... *H04N 19/91* (2014.11); *H04N 19/124* (2014.11); *H04N 19/184* (2014.11)

(58) Field of Classification Search
CPC ..... H04N 19/91; H04N 19/124; H04N 19/184
(Continued)

(56) References Cited

U.S. PATENT DOCUMENTS

| 5,986,594 A | 11/1999 | Nakayama |
| 2019/0130212 A1 | 5/2019 | Cheng |

(Continued)

FOREIGN PATENT DOCUMENTS

| CN | 111224670 A | 6/2020 |
| CN | 111797855 A | 10/2020 |

(Continued)

OTHER PUBLICATIONS

International Search Report in the international application No. PCT/CN2021/098413, mailed on Jan. 21, 2022. 6 pages with English translation.

(Continued)

*Primary Examiner* — Allen C Wong
(74) *Attorney, Agent, or Firm* — BAYES PLLC

(57) ABSTRACT

An image processing method, an encoding method, an image processing apparatus, and an encoding apparatus are provided. The image processing method includes the following operations. An encoded bitstream is received from a trained encoder. The encoded bitstream is decoded by a trained decoder to obtain a decoded reconstructed image. The decoded reconstructed image or the decoded reconstructed image subjected to image post-processing is processed by a trained task execution network to perform or complete a machine learning task. The trained encoder and the trained decoder belong to a trained codec network.

20 Claims, 7 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2021/0211684 A1* | 7/2021 | Andreopoulos | H04N 19/176 |
| 2022/0284236 A1* | 9/2022 | Misraa | G06V 10/26 |

FOREIGN PATENT DOCUMENTS

| | | |
|---|---|---|
| CN | 111968044 A | 11/2020 |
| WO | 2020070376 A1 | 4/2020 |

OTHER PUBLICATIONS

Written Opinion of the International Search Authority in the international application No. PCT/CN2021/098413, mailed on Jan. 21, 2022. 6 pages with English translation.

M. Rafie et al., "Evaluation Framework for Video Coding for Machines", ISO/IEC JTC1/SC29/WG2, N00042, Jan. 2021, the whole document, 48 pages.

Zhengxue Cheng et al., "Learned Image Compression with Discretized Gaussian Mixture Likelihoods and Attention Modules", arXiv: 2001.01568v3 [eess.IV] Mar. 30, 2020, the whole document, 15 pages.

Yuxin Wu and Alexander Kirillov and Francisco Massa and Wan-Yen Lo and Ross Girshick. "Detectron2 is a platform for object detection, segmentation and other visual recognition tasks", 2019, the whole document, 3 pages.

Chamain Lahiru D et al: "End-to-End optimized image compression for machines, a study", 2021 Data Compression Conference (DCC), IEEE, Mar. 23, 2021 (Mar. 23, 2021), pp. 163-172, XP033912872, DOI: 10.1109/DCC50243.2021.00024, the whole document.

Le Nam et al: "Image Coding For Machines: an End-To-End Learned Approach", ICASSP 2021-2021 IEEE International Conference on Acoustics, Speech and Signal Processing (ICASSP), IEEE, Jun. 6, 2021 (Jun. 6, 2021), pp. 1590-1594, XP033954598, DOI: 10.1109/ICASSP39728.2021.9414465, the whole document.

Supplementary European Search Report in the European application No. 21936597.0, mailed on Mar. 13, 2025. 13 pages.

* cited by examiner

IMAGE PROCESSING, NETWORK TRAINING AND ENCODING METHODS, APPARATUS, DEVICE, AND STORAGE MEDIUM

CROSS-REFERENCE TO RELATED APPLICATIONS

This application is a continuation of International Patent Application No. PCT/CN2021/098413 filed on Jun. 4, 2021, which claims the benefit of priority to Chinese patent application No. 202110415028.1 filed on Apr. 17, 2021, both of which are hereby incorporated by reference in their entireties.

BACKGROUND

At present, an input image is encoded by an encoder at an encoding side, and an encoded bitstream is generated and transmitted to a decoding side; the encoded bitstream is decoded at the decoding side to obtain a decoded reconstructed image; and finally, a machine learning task is performed based on the decoded reconstructed image.

SUMMARY

Embodiments of the present disclosure relate to image technologies, and relate to, but are not limited to, an image processing method, an encoding method, an image processing apparatus, and an encoding apparatus.

In a first aspect, the embodiments of the present disclosure provide an image processing method which includes the following operations. An encoded bitstream is received from a trained encoder. The encoded bitstream is decoded by a trained decoder to obtain a decoded reconstructed image. The decoded reconstructed image or the decoded reconstructed image subjected to image post-processing is processed by a trained task execution network to perform or complete a machine learning task. The trained encoder and the trained decoder belong to a trained codec network. A training process of the trained codec network and the trained task execution network includes the following operations. Based on a joint loss function of the codec network and the task execution network and a preset sample training set, joint training of the codec network and the task execution network is performed until a value of the joint loss function meets a convergence condition, to obtain the trained codec network and the trained task execution network. The task execution network performs the machine learning task based on the decoded reconstructed image output from the codec network, and the joint loss function includes a loss function of the task execution network and a function representing a bitrate of a feature bitstream of an input image of the codec network.

In a second aspect, the embodiments of the present disclosure provide an encoding method which includes the following operations. Based on a joint loss function of a codec network and a task execution network and a preset sample training set, joint training of the codec network and the task execution network is performed until a value of the joint loss function meets a convergence condition, to obtain a trained codec network and a trained task execution network. A trained encoder encodes an input image to obtain an encoded bitstream, the trained encoder belongs to the trained codec network. The task execution network performs a machine learning task based on a decoded reconstructed image output from the codec network, and the joint loss function includes a loss function of the task execution network and a function representing a bitrate of a feature bitstream of an input image of the codec network.

In a third aspect, the embodiments of the present disclosure provide an image processing apparatus which includes a transceiver, a trained decoder and a trained task execution network. The transceiver is configured to receive an encoded bitstream from a trained encoder. The trained decoder is configured to decode the encoded bitstream to obtain a decoded reconstructed image. The trained task execution network is configured to process the decoded reconstructed image or the decoded reconstructed image subjected to image post-processing, to perform a machine learning task. The trained encoder and the trained decoder belong to a trained codec network. A training process of the trained codec network and the trained task execution network includes the following operations. Based on a joint loss function of the codec network and the task execution network and a preset sample training set, joint training of the codec network and the task execution network is performed until a value of the joint loss function meets a convergence condition, to obtain the trained codec network and the trained task execution network. The task execution network performs the machine learning task based on the decoded reconstructed image output from the codec network, and the joint loss function includes a loss function of the task execution network and a function representing a bitrate of a feature bitstream of an input image of the codec network.

In a fourth aspect, the embodiments of the present disclosure provide an encoding apparatus, including: a training device, and a trained encoder. The training device is configured to perform, based on a joint loss function of a codec network and a task execution network and a preset sample training set, joint training of the codec network and the task execution network until a value of the joint loss function meets a convergence condition, to obtain a trained codec network and a trained task execution network. The trained encoder is configured to encode an input image is encoded through a trained encoder to obtain an encoded bitstream, the trained encoder belongs to the trained codec network. The task execution network performs a machine learning task based on a decoded reconstructed image output from the codec network, and the joint loss function includes a loss function of the task execution network and a function representing a bitrate of a feature bitstream of an input image of the codec network.

BRIEF DESCRIPTION OF THE DRAWINGS

The accompanying drawings, which are incorporated in and constitute a part of the specification, illustrate embodiments consistent with the present disclosure and together with the specification serve to explain the technical solutions of the present disclosure.

DETAILED DESCRIPTION

In order to make the purpose, technical solutions and advantages of the embodiments of the present disclosure clearer, the specific technical solutions of the present disclosure will be further described in detail with reference to the drawings in the embodiments of the present disclosure. The following embodiments are used to illustrate the present disclosure, but are not intended to limit the scope of the present disclosure.

Unless otherwise defined, all technical and scientific terms used herein have the same meaning as would normally be understood by those skilled in the art of the present disclosure. The terminology used herein is for the purpose of describing the embodiments of the present disclosure only and is not intended to limit the present disclosure.

The phrase "some embodiments" referred to in the following description describes a subset of all possible embodiments. However, it is understood that "some embodiments" may be the same subset or different subsets of all possible embodiments and may be combined with each other without conflict.

It should be noted that the term "first\second\third" referred to in the embodiments of the present disclosure is used to distinguish between similar or different objects and does not represent a particular order for objects. It should be understood that "first\second\third" may be interchanged in a particular order or sequencing where permissible to enable the embodiments of the present disclosure described herein to be implemented in an order other than that illustrated or described herein.

The overall framework and the business scenario described in the embodiments of the present disclosure are intended to more clearly explain the technical solutions of the embodiments of the present disclosure, and do not constitute a limitation to the technical solutions provided by the embodiments of the present disclosure. As those of ordinary skill in the art will know, with the evolution of the overall framework and the emergence of new business scenarios, the technical solutions provided by the embodiments of the present disclosure are equally applicable to similar technical problems.

Figure 1:
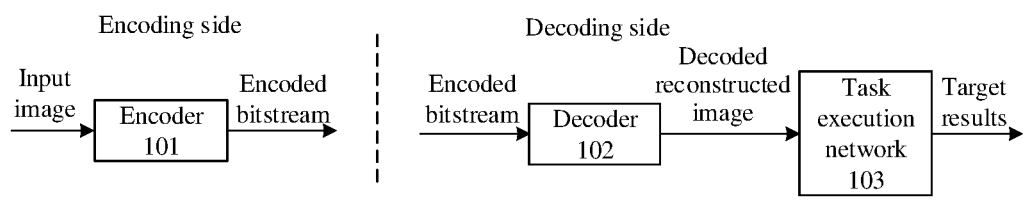
FIG. 1 is a schematic diagram of an overall framework provided by an embodiment of the present disclosure.

FIG. 1 is a schematic diagram of an overall framework provided by an embodiment of the present disclosure. As illustrated in FIG. 1, the overall framework includes an encoder 101, a decoder 102, and a task execution network 103. The encoder 101 belongs to an encoding side device, the decoder 102 and the task execution network 103 belong to an decoding side device, and the encoding side device and the decoding side device exchange information by establishing a wireless connection. The encoder 101 encodes an input image to obtain an encoded bitstream. The encoded bitstream is wirelessly transmitted to the decoding side device, and the decoder 102 decodes the encoded bitstream to obtain a decoded reconstructed image. The task execution network 103 performs a machine learning task based on the decoded reconstructed image to obtain target results.

It should be noted that the encoding side device may also have a decoder, and the decoding side device may also have an encoder.

Figure 2:
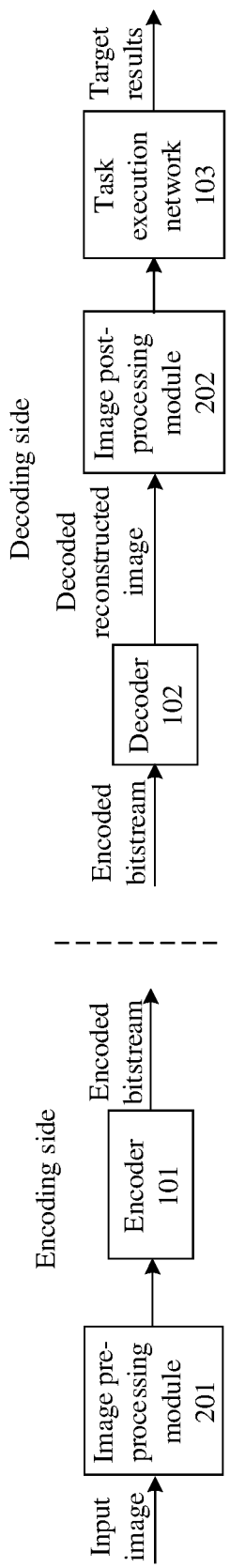
FIG. 2 is a schematic diagram of an overall framework provided by another embodiment of the present disclosure.

FIG. 2 is a schematic diagram of an overall framework provided by an embodiment of the present disclosure. As illustrated in FIG. 2, the overall framework includes an image pre-processing module 201, an encoder 101, a decoder 102, an image post-processing module 202 and a task execution network 103. The image pre-processing module 201 and the encoder 101 belong to an encoding side device, and the decoder 102, the image post-processing module 202 and the task execution network 103 belong to a decoding side device, and the encoding side device and the decoding side device exchange information by establishing a wireless connection. The image pre-processing module 201 pre-processes the input image and sends the input image subjected to pre-processing to the encoder 101, and the encoder 101 encodes the input image subjected to pre-processing to obtain an encoded bitstream. The encoded bitstream is wirelessly transmitted to the decoding side device, and the decoder 102 decodes the encoded bitstream to obtain a decoded reconstructed image. The image post-processing module 202 (symmetrical to the image pre-processing module 201) performs image post-processing on the decoded reconstructed image to obtain a decoded reconstructed image subjected to image post-processing. The task execution network 103 performs a machine learning task based on the decoded reconstructed image subjected to image post-processing to obtain target results.

Figure 3:
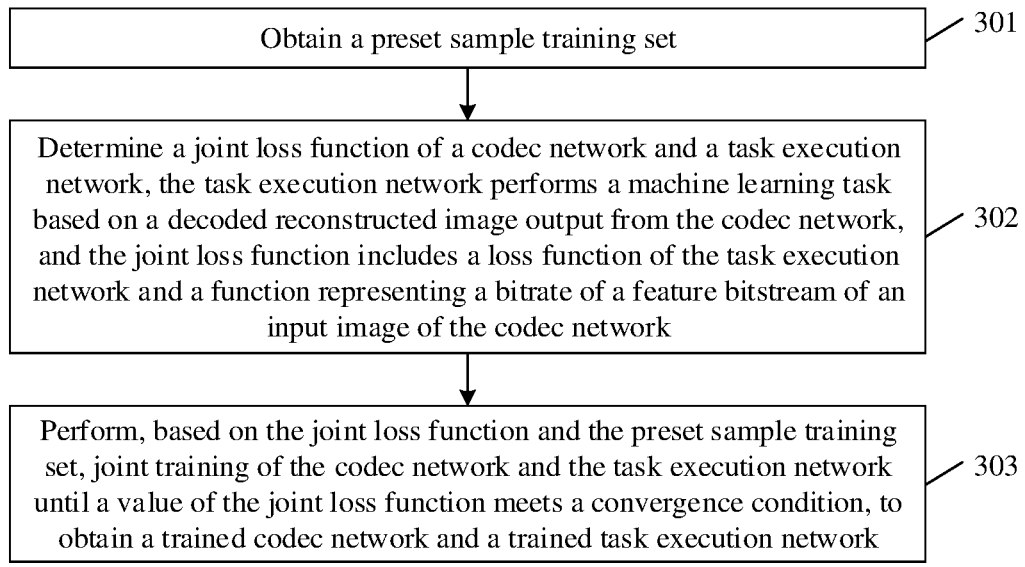
FIG. 3 is an implementation flowchart of a network training method of an embodiment of the present disclosure.

An embodiment of the present disclosure firstly provides a network training method. FIG. 3 is an implementation flowchart of a network training method of an embodiment of the present disclosure. As illustrated in FIG. 3, the method may include the following operations 301 to 303.

In an operation 301, a preset sample training set is obtained.

In an operation 302, a joint loss function of a codec network and a task execution network is determined. The task execution network performs a machine learning task based on a decoded reconstructed image output from the codec network, and the joint loss function includes a loss function of the task execution network and a function representing a bitrate of a feature bitstream of an input image of the codec network.

It should be noted that a network structure of the codec network may be any neural network structure which is not limited in the embodiment of the present disclosure. For example, the codec network is a cheng2020 network, that is, a network pointed out by "Cheng Z, Sun H, Takeuchi M, et al. Learned image compression with discretized gaussian mixture likelihoods and attention modules[C]//Proceedings of the IEEE/CVF Conference on Computer Vision and Pattern Recognition. 2020: 7939-7948".

Similarly, a network structure of the task execution network is not limited, and can be any machine learning model. For example, the task execution network is a Faster RCNN X101-FPN target detection network in Facebook Research Institute's open source detector 2, that is, a target detection network pointed out by "Yuxin Wu and Alexander Kirillov and Francisco Massa and Wan-Yen Lo and Ross Girshick. Detectron2. [OL] https://github.com/facebookresearch/detectron2. 2019".

There is no limitation on the task performed by the task execution network. For example, the task execution network performs a segmentation task, a classification task or an identification task in industry.

In an operation 303, based on the joint loss function and the preset sample training set, joint training is performed on the codec network and the task execution network until a value of the joint loss function meets a convergence condition, to obtain a trained codec network and a trained task execution network.

Understandably, network parameters of the codec network and the task execution network are adjusted based on the value of the joint loss function which is determined based on results of an current input image passing through both the codec network and the task execution network, thereby realizing a joint training.

The codec network includes an encoder and a decoder, and each of the encoder and the decoder has a neural network structure. The function of the codec network and the function of the task execution network can be performed on the same device or on different devices. When the functions are performed on the same device, the encoded bitstream output from the encoder can be transmitted to the decoder through an analog channel, and a device used for performing network training (hereinafter referred to as training device) and a device where the codec network is located can also be the same device or can be different devices. When the training device and the device where the codec network is located are different devices, the training device can obtain results output from the encoder, the decoder and the task execution network, and determine a value of the joint loss function of this training based on the obtained results and the sample data used in this training.

When the function of the codec network and the function of the task execution network are executed on different devices, i.e., the encoder is implemented on the encoding side device, the decoder and the task execution network are implemented on the decoding side device, the encoding side device and the decoding side device are different devices. The training device can be the encoding side device, the decoding side device or the third party device. The training device can obtain the results output from the encoder, the decoder and the task execution network, and determine a value of the joint loss function of this training based on the obtained results and the sample data used in this training.

After analysis, it is found that there is no special optimization for the machine learning task in the related arts, thus, the redundant information that is not related to the machine learning task cannot be effectively deleted and removed. However, in the embodiments of the present disclosure, joint training of the codec network and the task execution network is performed, and the joint loss function used for the joint training includes: a loss function of the task execution network and a function representing a bitrate of a feature bitstream of an input image of the codec network. In this way, under the constraint of a certain bitrate, it enables the task execution network to achieve better performance when performing the machine learning task on the decoded reconstructed image.

In some embodiments, the joint loss function further includes a loss function representing differences between the input image of the codec network and the decoded reconstructed image that is output from the codec network and corresponds to the input image.

In some embodiments, the joint loss function further includes a function representing a bitrate of a bitrate estimation bitstream.

In some embodiments, the joint loss function is a sum of all the functions included in the joint loss function. The loss function of the task execution network is given a first weight, and the loss function representing the differences is given a second weight.

For example, as illustrated in a Formula (1), in some embodiments, the expression of the joint loss function may be:

$$\text{loss}=R(\hat{y})+\lambda_1 \cdot \text{loss}_{task} \quad \text{Formula (1)}$$

wherein $R(\hat{y})$ is the function representing the bitrate of the feature bitstream of the input image, $\lambda_1$ is the first weight and $\text{loss}_{task}$ is the loss function of the task execution network.

As another example, as illustrated in a Formula (2), in some embodiments, the expression of the joint loss function may be:

$$\text{loss}=R(\hat{y})+R(\hat{z})+\lambda_1 \cdot \text{loss}_{task} \quad \text{Formula (2)}$$

wherein $R(z)$ is the function representing the bitrate of the bitrate estimation bitstream.

For another example, as illustrated a Formula (3), in some embodiments, the expression of the joint loss function may be:

$$\text{loss}=R(\hat{y})+\lambda_1 \cdot \text{loss}_{task}+\lambda_2 \cdot D(x,\hat{x}) \quad \text{Formula (3)}$$

wherein $\lambda_2$ is the second weight, and $D(x, \hat{x})$ is the loss function representing the differences between the input image of the codec network and the decoded reconstructed image that is output from the codec network and corresponds to the input image.

As another example, as illustrated in a Formula (4), in some embodiments, the expression of the joint loss function may be:

$$\text{loss}=R(\hat{y})+R(\hat{z})+\lambda_1 \cdot \text{loss}_{task}+\lambda_2 \cdot D(x,\hat{x}) \quad \text{Formula (4)}$$

In some embodiments, the codec network includes an encoder and a decoder. An obtaining process of the decoded reconstructed image includes the following operations. An encoded bitstream is received. The encoded bitstream is obtained by encoding, by the encoder, the input image or the input image subjected to pre-processing. A decoded reconstructed image is obtained by decoding, by the decoder, the encoded bitstream.

Figure 4:
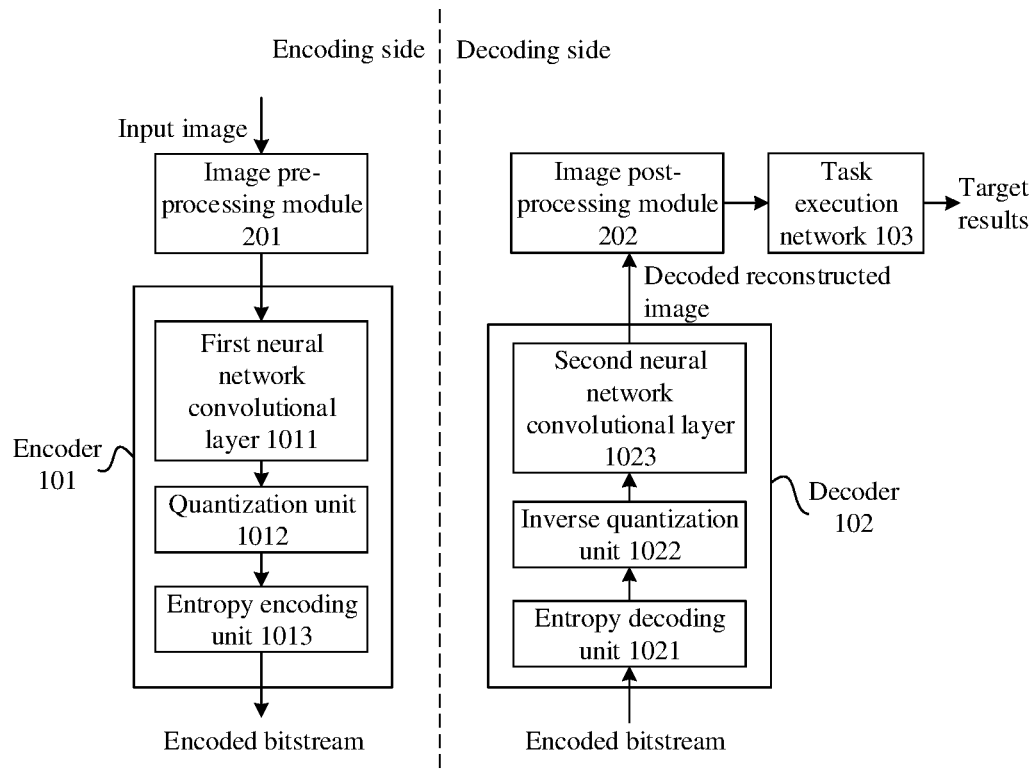
FIG. 4 is a schematic diagram of an overall framework provided by an embodiment of the present disclosure.

In some embodiments, each of the encoder and the decoder has a neural network structure. In addition, an embodiment of the present disclosure further provides an overall framework. FIG. 4 is a schematic diagram of an overall framework provided by an embodiment of the present disclosure. As illustrated in FIG. 4, the overall framework includes an image pre-processing module 201, an encoder 101, a decoder 102, an image post-processing module 202 and a task execution network 103. The encoder 101 includes a first neural network convolutional layer 1011, a quantization unit 1012 and an entropy encoding unit 1013. The decoder 102 includes an entropy decoding unit 1021, an inverse quantization unit 1022 and a second neural network convolutional layer 1023.

A workflow of the overall framework includes the followings. At an encoding side, the image pre-processing module 201 pre-processes an input image and sends the input image subjected to pre-processing to the first neural network convolutional layer 1011. The first neural network convolutional layer 1011 performs analysis transform of the input image subjected to pre-processing to obtain features of the input image. The quantization unit 1012 quantizes the features of the input image and inputs the quantized features of the input image to the entropy encoding unit 1013, the entropy encoding unit 1013 performs entropy encoding of the quantized features of the input image to obtain the encoded bitstream. The encoded bitstream includes a bitrate estimation bitstream and a feature bitstream of the input image.

At a decoding side, the encoded bitstream is received, and the entropy decoding unit 1021 performs entropy decoding of the feature bitstream based on the bitrate estimation bitstream to obtain entropy decoding results. The inverse quantization unit 1022 inversely quantizes the entropy decoding results and inputs the entropy decoding results subjected to inverse quantization to a second neural network convolutional layer 1023. The second neural network convolutional layer 1023 performs synthetic transform of the entropy decoding results subjected to inverse quantization to obtain the decoded reconstructed image. The image post-processing module 202 performs image post-processing (corresponding to pre-processing at the encoding side) on the decoded reconstructed image and sends the post-processed decoded reconstructed image to the task execution network 103. The task execution network 103 performs a machine learning task based on the decoded reconstructed image subjected to image post-processing to obtain target results.

It should be noted that in the embodiment of the present disclosure, the image pre-processing module 201 and the image post-processing module 202 are optional. That is, the overall framework illustrated in FIG. 4 may not include the image pre-processing module 201 and the image post-processing module 202. Accordingly, at the encoding side, the first neural network convolutional layer 1011 performs analysis transform of the un-preprocessed input image to obtain features of the input image. At the decoding side, the task execution network 103 performs a machine learning task based on the decoded reconstructed image that is un-preprocessed to obtain target results.

In the embodiment of the present disclosure, the inverse quantization unit 1022 is also optional. That is, the overall framework illustrated in FIG. 4 may not include the inverse quantization unit 1022, and accordingly, the second neural network convolutional layer 1023 performs synthetic transform of the entropy decoding results that are not inversely quantized, to obtain a decoded reconstructed image.

The codec network and task execution network obtained according to the above training are put into online use. Firstly, an embodiment of the present disclosure provides an encoding method which is applied to the encoding side. The method includes the following operations. An input image is encoded by a trained encoder to obtain an encoded bitstream. The trained encoder and the trained decoder belong to a trained codec network, and the trained codec network and the trained task execution network are obtained according to the network training method described in the embodiments of the present disclosure.

In some embodiments, the encoded bitstream includes a bitrate estimation bitstream and a feature bitstream of the input image, and the trained encoder has a neural network structure.

In some embodiments, the operation of encoding the input image by the trained encoder to obtain the encoded bitstream includes following operations. Analysis transform is performed, by a first neural network convolutional layer, on the input image or the input image subjected to pre-processing to obtain features of the input image. The features of the input image are quantized, and then the entropy encoding is performed on the quantized features of the input image, to obtain the bitrate estimation bitstream and the feature bitstream of the input image.

In the encoding method provided by the embodiment of the present disclosure, the input image can be a video frame image in a video or a certain image in a group of images. There is no limitation on what kind of visual media content the input image is.

Figure 5:
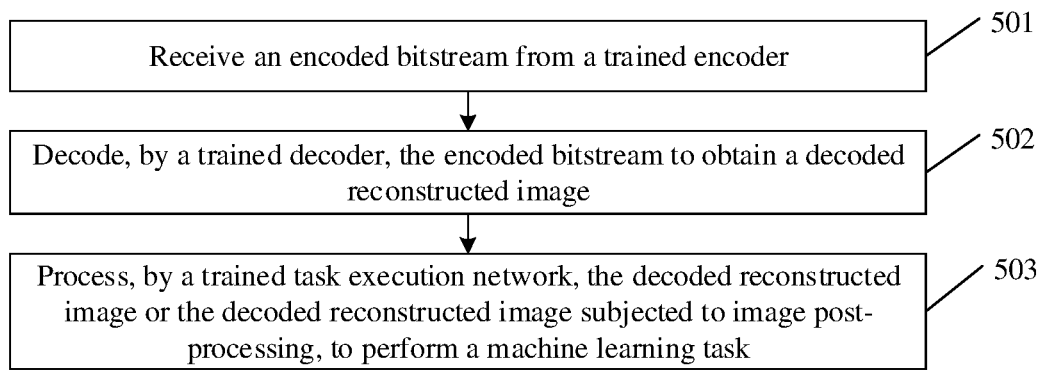
FIG. 5 is an implementation flowchart of an image processing method of an embodiment of the present disclosure.

An embodiment of the present disclosure provides an image processing method, which is applied to the decoding side. FIG. 5 is an implementation flowchart of an image processing method of an embodiment of the present disclosure, and the method may include the following operations 501 to 503.

In an operation 501, an encoded bitstream is received from a trained encoder.

In an operation 502, the encoded bitstream is decoded by a trained decoder to obtain a decoded reconstructed image.

In some embodiments, the encoded bitstream includes a bitrate estimation bitstream and a feature bitstream of the input image, and the trained decoder has a neural network structure. The decoding side performs, based on the bitrate estimation bitstream, entropy decoding of the feature bitstream to obtain entropy decoding results. The second neural network convolutional layer performs synthetic transform of the entropy decoding results or the entropy decoding results subjected to inverse quantization to obtain the decoded reconstructed image.

In an operation 503, the decoded reconstructed image or the decoded reconstructed image subjected to image post-processing is processed by a trained task execution network to perform a machine learning task.

The trained encoder and the trained decoder belong to a trained codec network, and the trained codec network and the trained task execution network are obtained according to the network training method described in the embodiments of the present disclosure.

In the related arts, the input image is directly encoded by a codec to generate a bitstream, and the bitstream is transmitted to the decoding side, then the bitstream is decoded at the decoding side to obtain a decoded reconstructed image, and then an intelligent task (i.e., machine learning task) is performed based on the decoded reconstructed image. However, the relevant codec is not specifically optimized for the intelligent task, and redundant information that is not related to the intelligent task cannot be effectively deleted.

Based on this, an exemplary application of the embodiment of the present disclosure in a practical application scenario will be described below.

In this embodiment of the present disclosure, an image end-to-end encoding network oriented to the intelligent task is provided, and the object is to achieve optimal performance when performing the intelligent task on the decoded reconstructed image subjected to decoding in a case that bitstream transmission is constrained by a certain bitrate.

Figure 6:
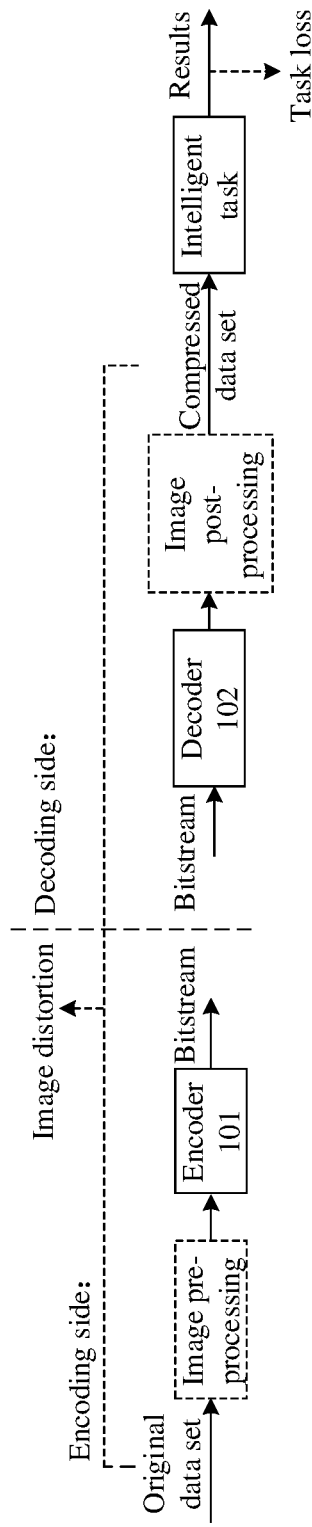
FIG. 6 is a schematic diagram of an overall framework provided by yet another embodiment of the present disclosure.
Figure 7:
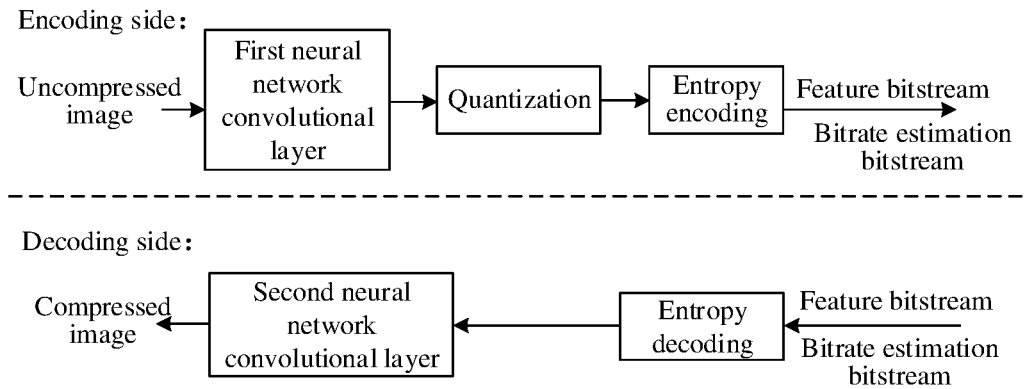
FIG. 7 is a workflow diagram of a codec provided by an embodiment of the present disclosure.

An overall framework of an embodiment of the present disclosure is illustrated in FIG. 6, in which image pre-processing is performed on (or not performed on) an original data set (i.e., the input image) and then the pre-processed original data set is sent to the encoder 101 for encoding and outputs an encoded bitstream, the encoded bitstream is sent to the decoder 102 for decoding, and followed by performing the image post-processing (corresponding to the pre-processing at the encoding side) to output a compressed image, i.e., a compressed data set, and the compressed data set is processed for the intelligent task to output results. The codec herein uses a neural network structure. As illustrated in FIG. 7, an analysis transform is performed on an uncompressed image by the first neural network convolutional layer, and the output features are quantized and sent to the entropy encoder for entropy encoding. The decoding side obtains the transmitted bitstream and then performs entropy decoding of the obtained bitstream. Additional bitrate estimation is required to be performed at the encoding side, and the bitstream information related to the bitrate estimation is transmitted to the decoding side, and then the decoded features are input to the second neural network convolutional layer for synthetic transform, and finally a compressed image (i.e., decoded reconstructed image) is reconstructed.

In FIG. 7, the bitstream includes a feature bitstream and a bitrate estimation bitstream. The feature bitstream refers to features of an image output through a neural network convolutional layer, and the bitrate estimation bitstream refers to a related parameter carrying the feature bitrate estimation probability.

In an embodiment of the present disclosure, a codec and an intelligent task network (i.e., task execution network) are trained together by a joint training method, and a loss function of the training is illustrated in a Formula (5):

$$\text{loss} = R(\hat{y}) + R(\hat{z}) + \lambda_1 \cdot \text{loss}_{task} + \lambda_2 \cdot D(x, \hat{x}) \qquad \text{Formula (5)}$$

wherein $R(\hat{y})$ is a function of a bitrate of feature expression (the feature bitstream in FIG. 7), $R(\hat{z})$ is a function of a bitrate of side information (the bitrate estimation bitstream in FIG. 7), $\lambda_1$ and $\lambda_2$ represent rate-distortion trade-off parameters (i.e., the first weight and the second weight), different parameters $\lambda_1$ and $\lambda_2$ correspond to different models (i.e., different total bitrates), $\text{loss}_{task}$ refers to an intelligent task loss, and $D(x, \hat{x})$ refers to a distortion loss between the input image and the decoded reconstructed image.

For testing of the technical solution provided by the embodiment of the present disclosure, the cheng2020 network is used as the codec network, the Faster RCNN X101-FPN target detection network in Facebook Research Institute's open source detector 2 is used as the intelligent task network, and an VTM (Versatile Video Coding Test Model) 8.2 encoder is used as an anchor for performance comparison.

In the Formula 5, the $D(x, \hat{x})$ specifically uses mean square error as distortion, and $\text{loss}_{task}$ uses a loss function of target detection in Faster RCNN X101-FPN as a loss, and the function is illustrated in a Formula (6):

$$\text{loss}_{task} = L_{cls} + L_{box} \qquad \text{Formula (6)}$$

$$L_{cls} = L_{cls}(p(\cdot), u_i) = \sum_{i \in \sigma}^{I} -\log p(u_i, i) \qquad \text{Formula (7)}$$

$$L_{box} = \qquad \text{Formula (8)}$$

$$\lambda[f(u)]L_{box}(t^u, v) = \lambda[f(u)] \sum_{j \in \{x,y,w,h\}} \text{smooth}_{L_1}(t_j^u - v_j)$$

$$\text{smooth}_{L_1}(t_j^u - v_j) = \begin{cases} 0.5(t_j^u - v_j)^2 & \text{if } |t_j^u - v_j| < 1, \\ |t_j^u - v_j| - 0.5 & \text{otherwise} \end{cases} \qquad \text{Formula (9)}$$

$$[f(u)] = \begin{cases} 1 & u \geq 1, \\ 0 & \text{otherwise} \end{cases} \qquad \text{Formula (10)}$$

In the Formula (6), $L_{cls}$ is a loss of classification, $L_{box}$ refers to a loss of target box position, I refers to a total number of regions of interest output from the network, i refers to an index of the region of interest. The σ refers to a case in which there is a probability of a real class in prediction of the i-th region of interest, and $u_i$ refers to that the i-th region of interest is the real class. The p(u, i) in a Formula (7) refers to a network estimation probability of the i-th region of interest belonging to the u-th class. In a Formula (8), $t_j^u$ refers to relative offsets between a regression box which is predicted to be belonging to the real class and the anchor regression box in the network, $t^u = \{t_x^u, t_y^u, t_w^u, t_h^u\}$, where $$t_x = \frac{x - x_a}{w_a}, t_y = \frac{y - y_a}{h_a}, t_w = \log\frac{w}{w_a}, t_h = \log\frac{h}{h_a},$$

where x refers to an x coordinate of an upper left vertex of the predicted regression box, y refers to a y coordinate of the upper left vertex of the predicted regression box, w refers to a width w of the predicted regression box, h refers to a length h of the predicted regression box, $x_a$, $y_a$, $w_a$ and $h_a$ represent four parameters of the anchor regression box, $v_j$ refers to four relative offsets between a real box and the anchor regression box in a label, $v^u = \{v_x, v_y, v_w, v_h\}$, where $$v_x = \frac{x^* - x_a}{w_a}, v_y = \frac{y^* - y_a}{h_a}, v_w = \log\frac{w^*}{w_a}, v_h = \log\frac{h^*}{h_a},$$

where x* refers to an x* coordinate of an upper left vertex of the real box in the label, y* refers to a y* coordinate of the upper left vertex of the real box in the label, w* refers to a width w* of the real box in the label, h* refers to a length h* of the real box in the label.

Test results are illustrated in Table 1, Table 2 and Table 3 below. The Table 1 illustrates task performance of an anchor compressed by using VTM8.2. The Table 2 illustrates evaluation results of a predefined task network (faster R-CNN X101-FPN in Detecton2) with end-to-end image encoding input consistent with an anchor point. There is an optimized cheng2020 network, and network parameter bitrate points are all 6 points. The Table 3 illustrates performance comparison between the technical solution provided by the embodiment of the present disclosure and the anchor point in a target detection task.

The test results of this solution illustrate that the performance of the end-to-end compression method of joint training of the codec and intelligent task provided by the embodiment of the present disclosure is better than that of the anchor. The solution uses evaluation indicators BD-mAP (BitDistortion-mean Average Precision) (average quality difference per unit over the whole limited bitrate range) and BD-BPP (BitDistortion-Bits Per Pixel) (average bit difference percentage per pixel over the whole limited quality range), where the BD-mAP is calculated as illustrated in a Formula (11):

$$BDmAP = \frac{1}{r_H - r_L} \int_{r_L}^{r_H} (D_2(r) - D_1(r)) dD \qquad \text{Formula (11)}$$

In the Formula (11), $r_H = \log(BPP_H)$ is the highest point of bits per pixel of the output bitstream, $r_L = \log(BPP_L)$ is the lowest point of bits per pixel of the output bitstream, $D_2(r)$ and $D_1(r)$ are respectively two R-D curves, and D(r) is a cubic polynomial fitting R-D curve, and the fitting method is as illustrated in a Formula (12):

$$D(r) = a + br + cr^2 + dr^3 \qquad \text{Formula (12)}$$

In the Formula (12), r=log(BPP), where BPP is bits per pixel of the output bitstream, a, b, c, d are fitting parameters, and D is distortion (D is indicated by PSNR (Peak Signal to Noise Ratio)/mAP). Similarly, BD-BPP is calculated in a similar way, as illustrated in a Formula (13):

$$BD \text{ Bit per pixel} = \frac{1}{D_H - D_L} \int_{D_L}^{D_H} (r_2 - r_1) dD \quad \text{Formula (13)}$$

In the Formula (13), $D_H$ is the highest point of distortion corresponding to the output bitstream, $D_L$ is the lowest point of distortion corresponding to the output bitstream, $r_1$ and $r_2$ are two R-D curves, and these two curves are also R-D curves fitted with cubic polynomial, and the fitting method is as illustrated in a Formula (14):

$$r = a + bD + cD^2 + dD^3 \quad \text{Formula (14)}$$

The performance of the technical solution provided by the embodiment of the present disclosure is superior to the performance of the anchor, as illustrated in the Table 3, the BD-BPP (mAP) is −22.80% and the BD-mAP is −1.0184, which is the beneficial effect generated by the technical solution of the embodiment of the present disclosure.

TABLE 1

Performance of anchor in target detection task (VTM8.2 codec)

| Quantization Parameter | BPP | mAP |
|---|---|---|
| 22 | 0.83601788 | 0.76517548 |
| 27 | 0.496323715 | 0.76032878 |
| 32 | 0.277115735 | 0.749032079 |
| 37 | 0.146083233 | 0.722172818 |
| 42 | 0.073909964 | 0.672795607 |
| 47 | 0.035294544 | 0.566341802 |

TABLE 2

Performance of target detection task (optimized cheng2020 codec)

| Parameter | BPP | mAP |
|---|---|---|
| 1 | 0.5556372957 | 0.76346890 |
| 2 | 0.4531612348 | 0.76153704 |
| 3 | 0.3147077104 | 0.75533322 |
| 4 | 0.1958046374 | 0.74696396 |
| 5 | 0.1167023101 | 0.72394438 |
| 6 | 0.0746458029 | 0.70362475 |

TABLE 3

Performance comparison of "optimized cheng2020" and anchor

| | VTM8.2, | optimized cheng2020 |
|---|---|---|
| BD-BPP(mAP) | 29.54% | −22.80% |
| BD-mAP | 1.0184 | −1.0184 |

Figure 8:
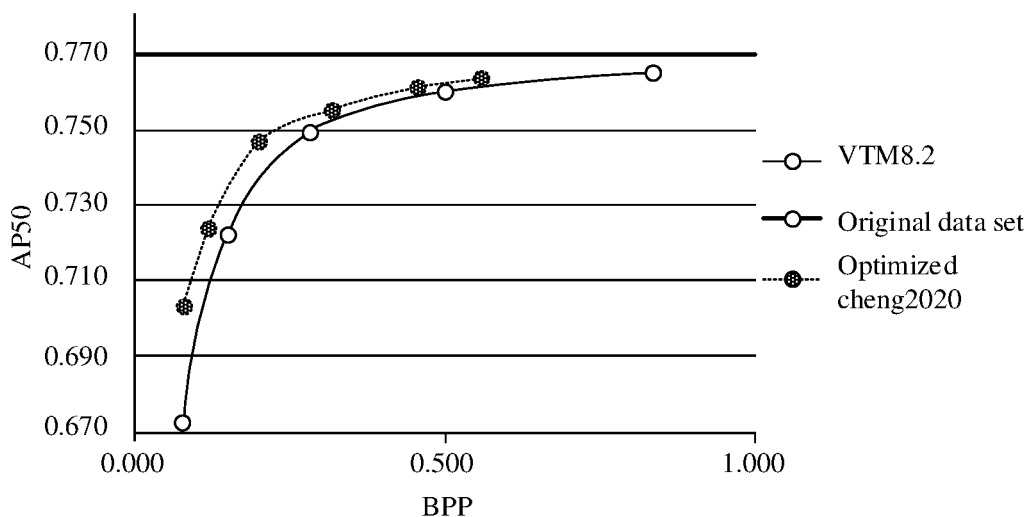
FIG. 8 is a schematic diagram of performance comparison between VTM 8.2 codec and optimized cheng2020 network.

FIG. 8 illustrates the performance comparison between the VTM 8.2 codec and the optimized Cheng 2020 network.

In the embodiment of the present disclosure, the codec network and the intelligent task network are jointly trained, and a new loss function oriented to the intelligent task is proposed, so that redundant information that is not related to the intelligent task can be removed, thereby improving the performance of the intelligent task.

Based on the foregoing embodiments, an embodiment of the present disclosure provides a network training apparatus, an image processing apparatus and an encoding apparatus, various modules included in these apparatuses and various units included in each module can be implemented by a processor. Of course, the modules included in these apparatuses and the units included in each module can also be implemented by specific logic circuits. In the implementation, the processor may be a central processing unit (CPU), a microprocessor (MPU), a digital signal processor (DSP), a field programmable gate array (FPGA), etc.

Figure 9:
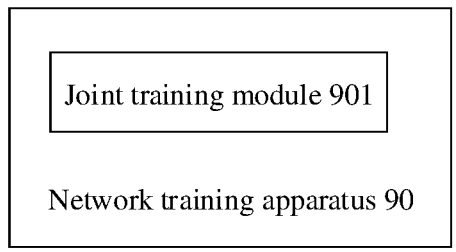
FIG. 9 is a schematic structural diagram of a network training apparatus of an embodiment of the present disclosure.

FIG. 9 is a schematic structural diagram of a network training apparatus of an embodiment of the present disclosure. As illustrated in FIG. 9, a network training apparatus 90 includes a joint training module 901, configured to: perform, based on a joint loss function of a codec network and a task execution network, and a preset sample training set, joint training of the codec network and the task execution network until a value of the joint loss function meets a convergence condition, to obtain a trained codec network and a trained task execution network. The task execution network performs a machine learning task based on a decoded reconstructed image output from the codec network, and the joint loss function includes a loss function of the task execution network and a function representing a bitrate of a feature bitstream of an input image of the codec network.

In some embodiments, the joint loss function further includes a loss function representing differences between the input image of the codec network and the decoded reconstructed image that is output from the codec network and corresponds to the input image.

In some embodiments, the joint loss function further includes a function representing a bitrate of a bitrate estimation bitstream.

In some embodiments, the joint loss function is a sum of the functions included in the joint loss function. The loss function of the task execution network is given a first weight, and the loss function representing the differences is given a second weight.

In some embodiments, the codec network includes an encoder and a decoder. The network training apparatus 90 further includes a receiving module and a decoding module. The receiving module is configured to receive an encoded bitstream. The encoded bitstream is obtained by encoding, by the encoder, the input image or the input image subjected to pre-processing. The decoding module is configured to decode, by the decoder, the encoded bitstream to obtain a decoded reconstructed image.

In some embodiments, each of the encoder and the decoder has a neural network structure. The obtaining process of the encoded bitstream includes the following operations. Analysis transform is performed, by a first neural network convolutional layer, on the input image or the input image subjected to pre-processing to obtain features of the input image. The features of the input image are quantized, and then the entropy encoding is performed on the quantized features of the input image to obtain the encoded bitstream. The encoded bitstream includes the bitrate estimation bitstream and the feature bitstream of the input image.

Correspondingly, the decoding module is configured to: perform, based on the bitrate estimation bitstream, entropy decoding of the feature bitstream to obtain entropy decoding results; and perform, by a second neural network convolutional layer, synthetic transform of the entropy decoding results or the entropy decoding results subjected to inverse quantization to obtain the decoded reconstructed image.

Figure 10:
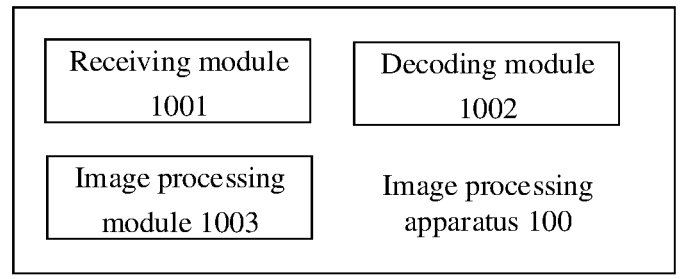
FIG. 10 is a schematic structural diagram of an image processing apparatus provided by an embodiment of the present disclosure.

FIG. 10 is a schematic structural diagram of an image processing apparatus provided by an embodiment of the present disclosure. As illustrated in FIG. 10, the image processing apparatus 100 includes a receiving module 1001, a decoding module 1002 and an image processing module 1003. The receiving module 1001 is configured to receive an encoded bitstream from a trained encoder. The decoding module 1002 is configured to decode, by a trained decoder, the encoded bitstream to obtain a decoded reconstructed image. The image processing module 1003 is configured to process, by a trained task execution network, the decoded reconstructed image, to perform a machine learning task. The trained encoder and the trained decoder belong to a trained codec network, and the trained codec network and the trained task execution network are obtained according to the network training method described in the embodiments of the present disclosure.

In some embodiments, the encoded bitstream includes a bitrate estimation bitstream and a feature bitstream of the input image, and the trained decoder has a neural network structure.

In some embodiments, the decoding module 1002 is configured to perform, based on the bitrate estimation bitstream, entropy decoding of the feature bitstream to obtain entropy decoding results; and perform, by a second neural network convolutional layer, synthetic transform of the entropy decoding results or the entropy decoding results subjected to inverse quantization to obtain the decoded reconstructed image.

Figure 11:
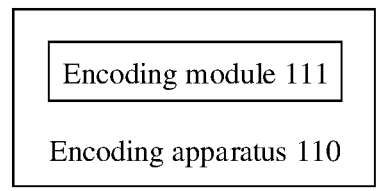
FIG. 11 is a schematic structural diagram of an encoding apparatus provided by an embodiment of the present disclosure.

FIG. 11 is a schematic structural diagram of an encoding apparatus provided by an embodiment of the present disclosure. As illustrated in FIG. 11, the encoding apparatus 110 includes an encoding module 111. The encoding module 111 is configured to encode, by a trained encoder, an input image to obtain an encoded bitstream. The trained encoder belongs to a trained codec network that is obtained according to the network training method described in the embodiments of the present disclosure.

In some embodiments, the encoded bitstream includes a bitrate estimation bitstream and a feature bitstream of the input image, and the trained encoder has a neural network structure.

In some embodiments, the encoding module 111 is configured to perform, by a first neural network convolutional layer, analysis transform of the input image or the input image subjected to pre-processing to obtain features of the input image; and quantize the features of the input image and then perform entropy encoding of the quantized features of the input image, to obtain the bitrate estimation bitstream and the feature bitstream of the input image.

The description of the apparatus embodiments is similar to the description of the method embodiments, and the apparatus embodiments have beneficial effects similar to those of the method embodiments. For the technical details not disclosed in the apparatus embodiments of the present disclosure, reference can be made to the description of the method embodiments of the present disclosure.

It should be noted that the division of the modules by the apparatus in the embodiments of the present disclosure is illustrative and is only the division of logical functions, and there can be another division mode in actual implementation. In addition, the functional units in various embodiments of the present disclosure may be integrated in one processing unit, may be physically present alone, or may have two or more units integrated in one unit. The integrated unit can be realized either in the form of hardware or in the form of software functional unit. It can also be realized by combining software and the hardware.

It should be noted that, in the embodiments of the present disclosure, if the method is implemented in the form of the software functional module and sold or used as an independent product, the method can also be stored in a computer-readable storage medium. Based on such an understanding, the technical solutions of the embodiments of the present disclosure substantially or parts making contributions to the related arts may be embodied in form of software product, and the computer software product is stored in a storage medium, including several instructions configured to enable an electronic device (e.g., the electronic device may include various types of devices capable of processing information, such as personal computers, notebook computers or cluster servers) to perform all or part of the methods described in the various embodiments of the present disclosure. The foregoing storage media includes various media capable of storing program codes, such as U disk, mobile hard disk, Read Only Memory (ROM), magnetic disk or optical disk. Thus, the embodiments of the present disclosure are not limited to any particular combination of the hardware and the software.

Figure 12:
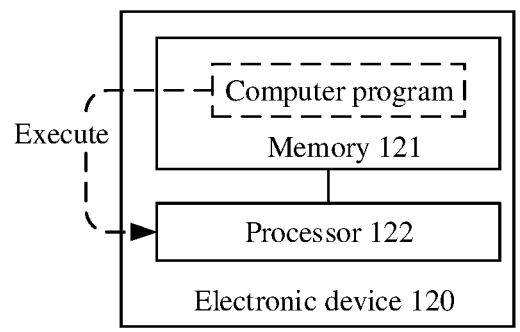
FIG. 12 is a schematic structural diagram of an electronic device provided by an embodiment of the present disclosure.

An embodiment of the present disclosure provides an electronic device. FIG. 12 is a diagram of a hardware entity of an electronic device of an embodiment of the present disclosure. As illustrated in FIG. 12, the electronic device 120 includes a memory 121 and a processor 122. The memory 121 stores a computer program executable on the processor 122, and the processor 122 implements the operations in the method provided in the embodiments of the present disclosure when executing the computer program.

It should be noted that the memory 121 is configured to store instructions and applications executable by the processor 122, and may also cache data (e.g., image data, audio data, voice communication data and video communication data) to be processed or already processed by modules in the processor 122 and the electronic device 120. The memory 121 may be implemented by a Flash memory or a Random Access Memory (RAM).

An embodiment of the present disclosure provides a computer-readable storage medium, having stored thereon a computer program that, when being executed by a processor, implements the operations in the method provided in the embodiments of the present disclosure.

An embodiment of the present disclosure provides a computer program product including instructions that, when run on a computer, cause the computer to perform the operations in the method provided by the method embodiments of the present disclosure.

It should be pointed out that the description of the storage medium embodiment and the device embodiments is similar to the description of the method embodiments and the storage medium embodiment and the device embodiments have beneficial effects similar to those of the method embodiments. For the technical details not disclosed in the storage media embodiment and device embodiments of the present disclosure, reference can be made to the description of the method embodiments of the present disclosure.

It should be understood that "one embodiment", "an embodiment" or "some embodiments" referred to throughout the whole specification means that specific features, structures or characteristics related to the embodiment(s) are included in at least one embodiment of the present disclosure. Thus, the words "in one embodiment", "in an embodiment" or "in some embodiments" appearing throughout the specification do not necessarily refer to the same embodiment. Furthermore, these specific features, structures or characteristics may be combined in any suitable manner in one or more embodiments. It should be understood that in various embodiments of the present disclosure, the magnitude of a sequence number of the above-mentioned processes does not imply the execution sequence, and the execution sequence of each process should be determined by its function and inherent logic, and should not for any limit to the implementation process of the embodiments of the present disclosure. The sequence numbers of the embodiments of the present disclosure are adopted for descriptive purpose only and do not represent the advantages and disadvantages of the embodiments. The above description of the various embodiments tends to emphasize the differences between the various embodiments, mutual reference may be made to the same or similar part of the various embodiments and the same or similar part of the various embodiments will not be repeated herein for the sake of brevity.

The term "and/or" herein is only an association relationship describing associated objects, which means that there may be three relationships. For example, "object A and/or object B" may have three meanings: the object A exists alone, the object A and the object B exist at the same time, and the object B exists alone.

It should be noted that, as used herein, the term "include", "contain" or any other variant thereof is intended to encompass non-exclusive inclusions, so that a process, method, object or apparatus that includes a series of elements not only includes those elements but also includes other elements that are not explicitly listed, or further includes elements inherent to such a process, method, object or device. In the absence of further limitations, an element defined by the phrase "includes a/an . . . " does not exclude the existence of another identical element in the process, method, object or device including the element.

In several embodiments provided by the present disclosure, it should be understood that the disclosed device and method may be implemented in other ways. The above-described embodiments are only illustrative. For example, the division of the modules is only the division of logical functions, and there can be another division mode in actual implementation. For example, multiple modules or components can be combined, or can be integrated into another system, or some features can be ignored or not implemented. In addition, coupling, direct coupling, or communication connection between various components that are illustrated or discussed may be implemented through some interfaces, and the indirect coupling or communication connection between the devices or modules may be electrical, mechanical, or in other forms.

The modules described above as separate components may or may not be physically separated and the components represented as modules may or may not be physical modules. That is, the modules may be located in one location or distributed on multiple network units. Some or all of the modules may be selected based on the actual needs to achieve the purpose of the solutions of the embodiment.

In addition, each functional module in each embodiment of the present disclosure may all be integrated into a processing unit, each module may serve as an independent unit, and two or more than two modules can be integrated into a unit. The integrated modules may be implemented either in the form of hardware or in the form of hardware and software functional units.

Those of ordinary skill in the art should know that all or part of the operations of the method embodiments may be implemented by associated hardware which is instructed by a program, the program may be stored in a computer-readable storage medium, and the program, when being executed, performs the operations of the method embodiments. The storage medium includes various media capable of storing program codes, such as a mobile storage device, a ROM, a magnetic disk or a compact disc.

Alternatively, when being implemented in form of a software functional module and sold or used as a stand-alone product, the integrated unit of the present disclosure may also be stored in a computer-readable storage medium. Based on such an understanding, the technical solutions of the embodiments of the present disclosure substantially or parts making contributions to the related arts may be embodied in form of a software product, and the computer software product is stored in a storage medium, including a plurality of instructions configured to enable an electronic device to execute all or part of the method in each embodiment of the present disclosure. The storage medium includes various media capable of storing program codes, such as a mobile storage device, a ROM, a magnetic disk or a compact disc.

The methods disclosed in several method embodiments provided by the present disclosure can be arbitrarily combined without conflict to obtain new method embodiments.

The features disclosed in several product embodiments provided by the present disclosure can be arbitrarily combined without conflict to obtain new product embodiments.

The features disclosed in several methods or device embodiments provided by the present disclosure may be arbitrarily combined without conflict to obtain new method or device embodiments.

The forgoing are only embodiments of the present disclosure, but the scope of protection of the present disclosure is not limited thereto. Any variations or replacements that would be apparent to those skilled in the art within the technical scope disclosed by the present disclosure shall fall within the scope of protection of the present disclosure. Therefore, the scope of protection of the present disclosure shall be subjected to the scope of protection of the claims.

The invention claimed is:

1. An image processing method, comprising:
  receiving an encoded bitstream from a trained encoder;
  decoding, by a trained decoder, the encoded bitstream to obtain a decoded reconstructed image; and
  processing, by a trained task execution network, the decoded reconstructed image or the decoded reconstructed image subjected to image post-processing, to perform a machine learning task,
  wherein the trained encoder and the trained decoder belong to a trained codec network, and a training process of the trained codec network and the trained task execution network comprises:
  performing, based on a joint loss function of the codec network and the task execution network and a preset sample training set, joint training of the codec network and the task execution network until a value of the joint loss function meets a convergence condition, to obtain the trained codec network and the trained task execution network,
  wherein the task execution network performs the machine learning task based on the decoded reconstructed image output from the codec network, and the joint loss function comprises a loss function of the task execution network and a function representing a bitrate of a feature bitstream of an input image of the codec network.

2. The method of claim 1, wherein the encoded bitstream comprises a bitrate estimation bitstream and the feature bitstream of the input image, and the trained decoder has a neural network structure; and wherein decoding, by the trained decoder, the encoded bitstream to obtain the decoded reconstructed image comprises:

performing, based on the bitrate estimation bitstream, entropy decoding of the feature bitstream to obtain entropy decoding results; and performing, by a second neural network convolutional layer, synthetic transform of the entropy decoding results or the entropy decoding results subjected to inverse quantization to obtain the decoded reconstructed image.

3. The method of claim 1, wherein the joint loss function further comprises a loss function representing differences between the input image of the codec network and the decoded reconstructed image that is output from the codec network and corresponds to the input image.

4. The method of claim 3, wherein the joint loss function further comprises a function representing a bitrate of a bitrate estimation bitstream.

5. The method of claim 3, wherein the joint loss function is a weighted sum of the functions included in the joint loss function, and wherein the loss function of the task execution network is given a first weight, and the loss function representing the differences is given a second weight.

6. An encoding method, comprising:

performing, based on a joint loss function of a codec network and a task execution network and a preset sample training set, joint training of the codec network and the task execution network until a value of the joint loss function meets a convergence condition, to obtain a trained codec network and a trained task execution network; and encoding, by a trained encoder, an input image to obtain an encoded bitstream, wherein the trained encoder belongs to the trained codec network, wherein the task execution network performs a machine learning task based on a decoded reconstructed image output from the codec network, and the joint loss function comprises a loss function of the task execution network and a function representing a bitrate of a feature bitstream of an input image of the codec network.

7. The method of claim 6, wherein the joint loss function further comprises a loss function representing differences between the input image of the codec network and the decoded reconstructed image that is output from the codec network and corresponds to the input image.

8. The method of claim 7, wherein the joint loss function further comprises a function representing a bitrate of a bitrate estimation bitstream.

9. The method of claim 7, wherein the joint loss function is a weighted sum of the functions included in the joint loss function, and wherein the loss function of the task execution network is given a first weight, and the loss function representing the differences is given a second weight.

10. The method of claim 6, wherein the encoded bitstream comprises a bitrate estimation bitstream and a feature bitstream of the input image, and the trained encoder has a neural network structure; and wherein encoding, by the trained encoder, the input image to obtain the encoded bitstream comprises:

performing, by a first neural network convolutional layer, analysis transform of the input image or the input image subjected to pre-processing to obtain features of the input image; and quantizing the features of the input image and then performing entropy encoding of the quantized features of the input image, to obtain the bitrate estimation bitstream and the feature bitstream of the input image.

11. An image processing apparatus, comprising:

a transceiver, configured to receive an encoded bitstream from a trained encoder;

a trained decoder, configured to decode the encoded bitstream to obtain a decoded reconstructed image; and a trained task execution network, configured to process the decoded reconstructed image or the decoded reconstructed image subjected to image post-processing, to perform a machine learning task, wherein the trained encoder and the trained decoder belong to a trained codec network, and a training process of the trained codec network and the trained task execution network comprises:

performing, based on a joint loss function of the codec network and the task execution network and a preset sample training set, joint training of the codec network and the task execution network until a value of the joint loss function meets a convergence condition, to obtain the trained codec network and the trained task execution network, wherein the task execution network performs the machine learning task based on the decoded reconstructed image output from the codec network, and the joint loss function comprises a loss function of the task execution network and a function representing a bitrate of a feature bitstream of an input image of the codec network.

12. The apparatus of claim 11, wherein the encoded bitstream comprises a bitrate estimation bitstream and the feature bitstream of the input image, and the trained decoder has a neural network structure, and wherein the trained decoder comprises:

an entropy decoder, configured to perform, based on the bitrate estimation bitstream, entropy decoding of the feature bitstream to obtain entropy decoding results; and a second neural network convolutional layer, configured to perform synthetic transform of the entropy decoding results or the entropy decoding results subjected to inverse quantization to obtain the decoded reconstructed image.

13. The apparatus of claim 11, wherein the joint loss function further comprises a loss function representing differences between the input image of the codec network and the decoded reconstructed image that is output from the codec network and corresponds to the input image.

14. The apparatus of claim 13, wherein the joint loss function is a weighted sum of the functions included in the joint loss function, and wherein the loss function of the task execution network is given a first weight, and the loss function representing the differences is given a second weight.

15. The apparatus of claim 11, wherein the joint loss function further comprises a function representing a bitrate of a bitrate estimation bitstream.

16. An encoding apparatus, comprising:

a training device, configured to perform, based on a joint loss function of a codec network and a task execution network and a preset sample training set, joint training of the codec network and the task execution network until a value of the joint loss function meets a convergence condition, to obtain a trained codec network and a trained task execution network; and a trained encoder, configured to encode an input image to obtain an encoded bitstream, wherein the trained encoder belongs to the trained codec network, wherein the task execution network performs a machine learning task based on a decoded reconstructed image output from the codec network, and the joint loss function comprises a loss function of the task execution network and a function representing a bitrate of a feature bitstream of an input image of the codec network.

17. The encoding apparatus of claim 16, wherein the joint loss function further comprises a loss function representing differences between the input image of the codec network and the decoded reconstructed image that is output from the codec network and corresponds to the input image.

18. The encoding apparatus of claim 17, wherein the joint loss function further comprises a function representing a bitrate of a bitrate estimation bitstream.

19. The encoding apparatus of claim 16, wherein the joint loss function is a weighted sum of the functions included in the joint loss function, and wherein the loss function of the task execution network is given a first weight, and the loss function representing the differences is given a second weight.

20. The encoding apparatus of claim 16, wherein the encoded bitstream comprises a bitrate estimation bitstream and a feature bitstream of the input image, and the trained encoder has a neural network structure; and wherein the trained encoder comprises:

a first neural network convolutional layer, configured to perform analysis transform of the input image or the input image subjected to pre-processing to obtain features of the input image; and a quantizer, configured to quantize the features of the input image; and an entropy encoder, configured to perform entropy encoding of the quantized features of the input image, to obtain the bitrate estimation bitstream and the feature bitstream of the input image.

* * * * *